United States Patent
Wakasa

(10) Patent No.: US 9,672,199 B2
(45) Date of Patent: *Jun. 6, 2017

(54) ELECTRONIC DEVICE AND ELECTRONIC DEVICE CONTROL METHOD

(71) Applicant: KYOCERA Corporation, Kyoto (JP)

(72) Inventor: Tetsushi Wakasa, Kanagawa (JP)

(73) Assignee: KYOCERA CORPORATION, Kyoto (JP)

(*) Notice: Subject to any disclaimer, the term of this patent is extended or adjusted under 35 U.S.C. 154(b) by 18 days.

This patent is subject to a terminal disclaimer.

(21) Appl. No.: 14/589,265

(22) Filed: Jan. 5, 2015

(65) Prior Publication Data

US 2015/0113392 A1    Apr. 23, 2015

Related U.S. Application Data

(63) Continuation of application No. 13/504,761, filed as application No. PCT/JP2010/069091 on Oct. 27, 2010, now Pat. No. 8,954,039.

(30) Foreign Application Priority Data

Oct. 28, 2009  (JP) .................................. 2009-247679

(51) Int. Cl.
    *H04M 3/42* (2006.01)
    *G06F 17/24* (2006.01)
    (Continued)

(52) U.S. Cl.
    CPC ............ *G06F 17/24* (2013.01); *G06F 17/211* (2013.01); *G06F 17/276* (2013.01); *G06F 17/3064* (2013.01); *H04M 1/274558* (2013.01)

(58) Field of Classification Search
    CPC ........... H04W 4/00; H04W 4/02; H04W 4/12; H04W 8/18; H04W 8/183
    (Continued)

(56) References Cited

U.S. PATENT DOCUMENTS 5,491,745 A    2/1996  Roeder
7,046,994 B1*  5/2006  Padawer ............... H04M 1/576
                                                       379/93.23
(Continued)

FOREIGN PATENT DOCUMENTS

JP    2002-152360 A    5/2002
JP    2003-167822 A    6/2003
(Continued)

OTHER PUBLICATIONS

International Search Report for PCT/JP2010/069091, mailed Nov. 30, 2010.
(Continued)

*Primary Examiner* — Temica M Beamer
(74) *Attorney, Agent, or Firm* — Hauptman Ham, LLP

(57) ABSTRACT

Disclosed are an electronic device and an electronic device control method that can use address information on the basis of an inputted string. The disclosed electronic device is provided with: a memory (44) that stores an address book that has names and address information; input keys (14) for inputting strings; a display unit (21) that displays both an input string inputted via the input keys (14) and a conversion candidate string which is a conversion candidate for the input string; a search execution unit (46) that searches the address book on the basis of an input string inputted via the input keys (14); and a control unit (45) that has the display unit (21) display, as a conversion candidate string, a name or address information that corresponds to the input string and was searched for by the search execution unit (46).

7 Claims, 10 Drawing Sheets

(51) Int. Cl.
*G06F 17/27* (2006.01)
*G06F 17/30* (2006.01)
*H04M 1/2745* (2006.01)
*G06F 17/21* (2006.01)

(58) Field of Classification Search
USPC .............................. 455/414.1, 551, 564, 566
See application file for complete search history.

(56) References Cited

U.S. PATENT DOCUMENTS

| | | | |
|---|---|---|---|
| 7,710,293 B2* | 5/2010 | Kallqvist | H04M 1/274558 341/22 |
| 8,064,886 B2* | 11/2011 | Hawkins | H04M 1/27455 455/412.1 |
| 2007/0207791 A1 | 9/2007 | Sasaki | |
| 2009/0131107 A1* | 5/2009 | Sasaki | H04M 1/274558 455/556.2 |
| 2010/0008490 A1* | 1/2010 | Gharachorloo | H04M 1/274558 379/216.01 |

FOREIGN PATENT DOCUMENTS

| | | |
|---|---|---|
| JP | 2004-32489 A | 1/2004 |
| JP | 2005-268984 A | 9/2005 |
| JP | 2006-60768 A | 3/2006 |

OTHER PUBLICATIONS

Notice of Reasons for Rejection issued to JP Application No. 2009-247679, mailed Feb. 4, 2014.

* cited by examiner

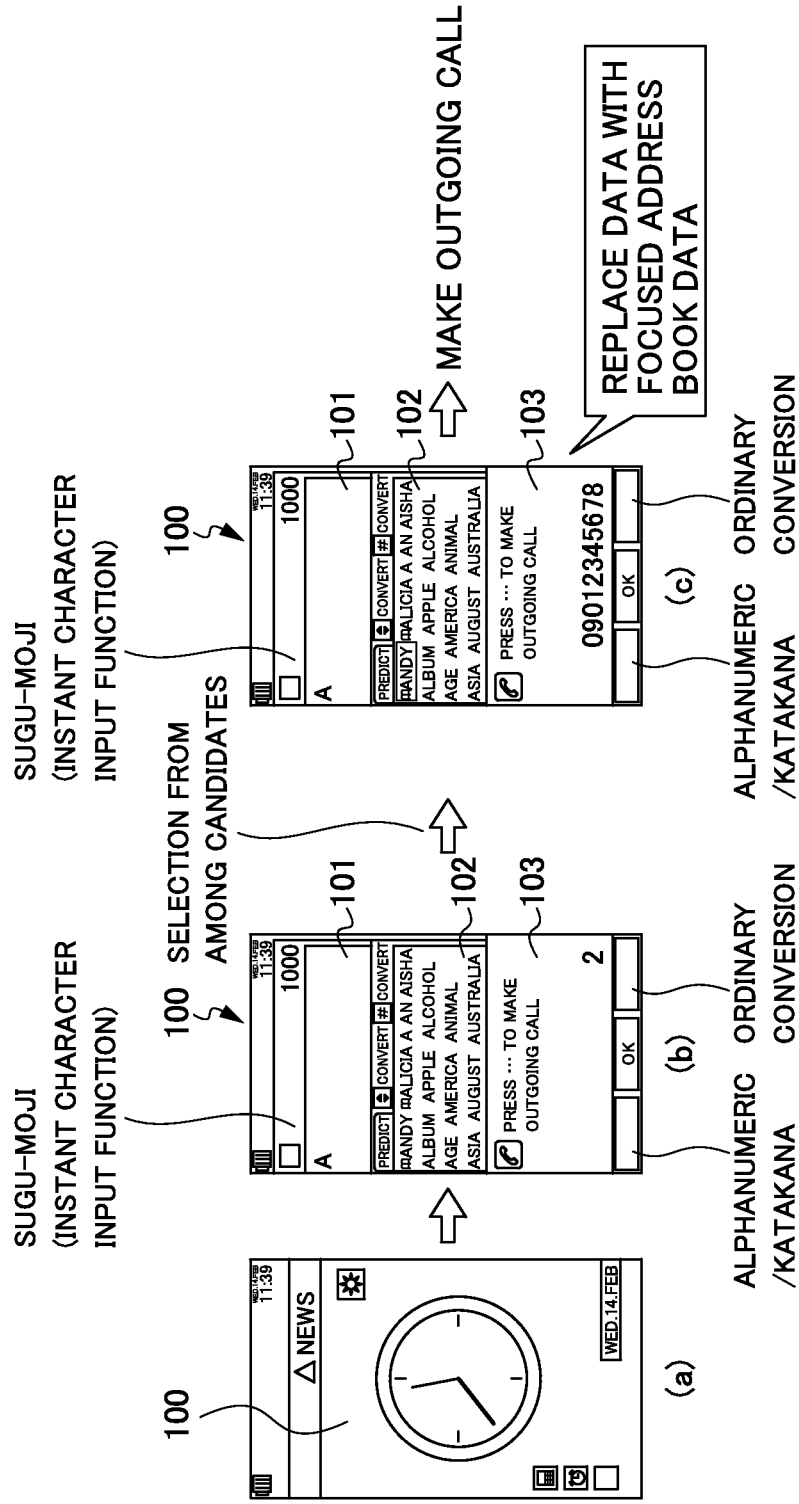

ELECTRONIC DEVICE AND ELECTRONIC DEVICE CONTROL METHOD

CROSS-REFERENCE TO RELATED APPLICATIONS

This application is a divisional of U.S. patent application Ser. No. 13/504,761 filed Apr. 27, 2012, which is the U.S. National Phase of International Patent Application No. PCT/JP2010/069091 filed Oct. 27, 2010, which claims priority to Japanese Patent Application No. 2009-247679 filed Oct. 28, 2009, all of which are incorporated by reference herein in their entirety.

FIELD

The present invention relates to an electronic device including an application that makes it possible to input characters, as well as a method of controlling the electronic device.

BACKGROUND

Conventionally, there has been a mobile telephone device (an electronic device) including: an operation unit for inputting a character string; a display unit that displays an input character string and conversion candidate character strings based on the input character string; and a control unit that executes input processing of a conversion candidate character string that is selected by way of the operation unit (see Patent Document 1). There exists a mobile telephone device including a storage unit that stores names and address information in association with one another as an address book.

Patent Document 1: Japanese Unexamined Patent Application, Publication No. 2004-32489

SUMMARY

Problems to be Solved by the Invention

However, in such mobile telephone devices, conversion candidate character strings have been merely input as text (input as characters), based on an input character string.

In such mobile telephone devices, in a case in which a user intends to utilize desired address information, the user had to access an address book through an operation by the user himself/herself to find the desired address information. Furthermore, as the number of items registered with the address book is increased, it becomes more difficult to find desired address information.

An object of the present invention is to provide an electronic device and a method of controlling the electronic device, which are capable of easily utilizing address information.

Means for Solving the Problems

An electronic device according to the present invention includes: a storage unit that stores address data including names and address information; an operation unit that inputs a character string; a display unit that displays the character string that is input by operating the operation unit, and conversion candidate character strings that are conversion candidates for the character string thus input; a search execution unit that searches the address data, based on the character string that is input by operating the operation unit; and a control unit that controls the display unit to display names or address information, which is associated with the input character string used by the search execution unit for searching, as conversion candidate character strings.

It is preferable for the electronic device to further include: a selection unit that selects a conversion candidate character string; and a determination unit that determines the conversion candidate character string selected by the selection unit; and an address information processing unit that executes processing associated with address information, in which, in a case in which the selection unit selects a conversion candidate character string linked with the address information, and the determination unit determines the conversion candidate character string thus selected, it is preferable for the control unit to control the address information processing unit to execute processing associated with the address information linked with the conversion candidate character string.

It is preferable for the electronic device to further include an information selection unit that selects address information, in which it is preferable for the storage unit to store address data including names and a plurality of pieces of address information, and in a case in which the selection unit selects a conversion candidate character string linked with address information, and the determination unit determines the conversion candidate character string thus selected, it is preferable for the control unit to control the display unit to display a plurality of pieces of address information linked with the conversion candidate character string, and in a case in which the information selection unit selects a single piece of address information, it is preferable for the control unit to control the address information processing unit to execute processing associated with the single piece of address information.

It is preferable for the electronic device to further include: a selection unit that selects a conversion candidate character string; and a determination unit that determines the conversion candidate character string selected by the selection unit; and a replacement unit that replaces an input character string with address information, and in a case in which the selection unit selects a conversion candidate character string linked with address information, and the determination unit determines the conversion candidate character string thus selected, it is preferable for the control unit to control the replacement unit to replace the input character string with the address information so as to be displayed.

It is preferable for the electronic device to further include a mode variation unit that varies a mode of displaying conversion candidate character strings on the display unit, between a first mode and a second mode different from the first mode, and in a case in which a conversion candidate character string linked with address information is displayed, it is preferable for the control unit to control the mode variation unit to display the conversion candidate character string in the second mode.

It is preferable for the electronic device to further include a plurality of processes as processing associated with the address information, in which it is preferable for the control unit to control the mode variation unit to display conversion candidate character strings, which are linked with address information displayed correspondingly to the plurality of processes, in different modes.

In the electronic device, it is preferable for the storage unit to store address data including names and registration numbers; it is preferable for the operation unit to include a plurality of keys assigned with non-numeric characters and numeric characters; in a case in which a key of the operation unit is operated in a state where an initial screen is displayed, it is preferable for the display unit to display a non-numeric character and a numeric character assigned to the key thus operated; and in a state where a non-numeric character string and a numeric character string are displayed on the display unit in response to an operation of keys of the operation unit, in a case in which the numeric character string displayed on the display unit coincides with one of the registration numbers as a result of searching by the search execution unit, it is preferable for the control unit to control the display unit to display a name or address information associated with the registration number.

In the electronic device, it is preferable for the storage unit to store address data including names and a plurality of pieces of address information; it is preferable for the operation unit to include a plurality of keys assigned with non-numeric characters and numeric characters; in a case in which a key of the operation unit is operated in a state where an initial screen is displayed, it is preferable for the display unit to display a non-numeric character and a numeric character assigned to the key thus operated; and in a state where a non-numeric character string and a numeric character string are displayed on the display unit in response to an operation of keys of the operation unit, in a case in which the numeric character string displayed on the display unit coincides with address information composed of a telephone number in the address data as a result of searching by the search execution unit, it is preferable for the control unit to control the display unit to display a name associated with the address information, or another address information associated with the name.

It is preferable for the electronic device to further include: a selection unit that selects a conversion candidate character string; and a replacement unit that replaces address information with an input non-numeric character string or an input numeric character string, in which it is preferable for the operation unit to include a plurality of keys assigned with non-numeric characters and numeric characters; in a case in which a key of the operation unit is operated in a state where an initial screen is displayed, it is preferable for the display unit to display a non-numeric character and a numeric character assigned to the key thus operated; and in a state where a non-numeric character string and a numeric character string are displayed on the display unit in response to an operation of keys of the operation unit, in a case in which the selection unit selects a conversion candidate character string associated with one of the names displayed on the display unit as a result of searching by the search execution unit, it is preferable for the control unit to control the replacement unit to replace the numeric character string displayed on the display unit with address information composed of a telephone number associated with the name, and to display the address information.

A method of controlling an electronic device according to the present invention includes: a storing step of storing address data including names and address information; an operating step of inputting a character string; a displaying step of displaying the character string that is input in the operating step, and conversion candidate character strings that are conversion candidates for the character string thus input; a search executing step of searching the address data, based on the character string that is input in the operating step; and a controlling step of controlling display of names or address information, which is associated with the input character string used for searching in the search executing step, as the conversion candidate character strings.

Effects of the Invention

According to the present invention, an electronic device and a method of controlling the electronic device are provided, which are capable of easily utilizing information in an address book.

BRIEF DESCRIPTION OF THE DRAWINGS

FIG. 10 is a fourth schematic diagram showing a screen to transition in a case of utilizing the character input function.

DETAILED DESCRIPTION

Figure 1:
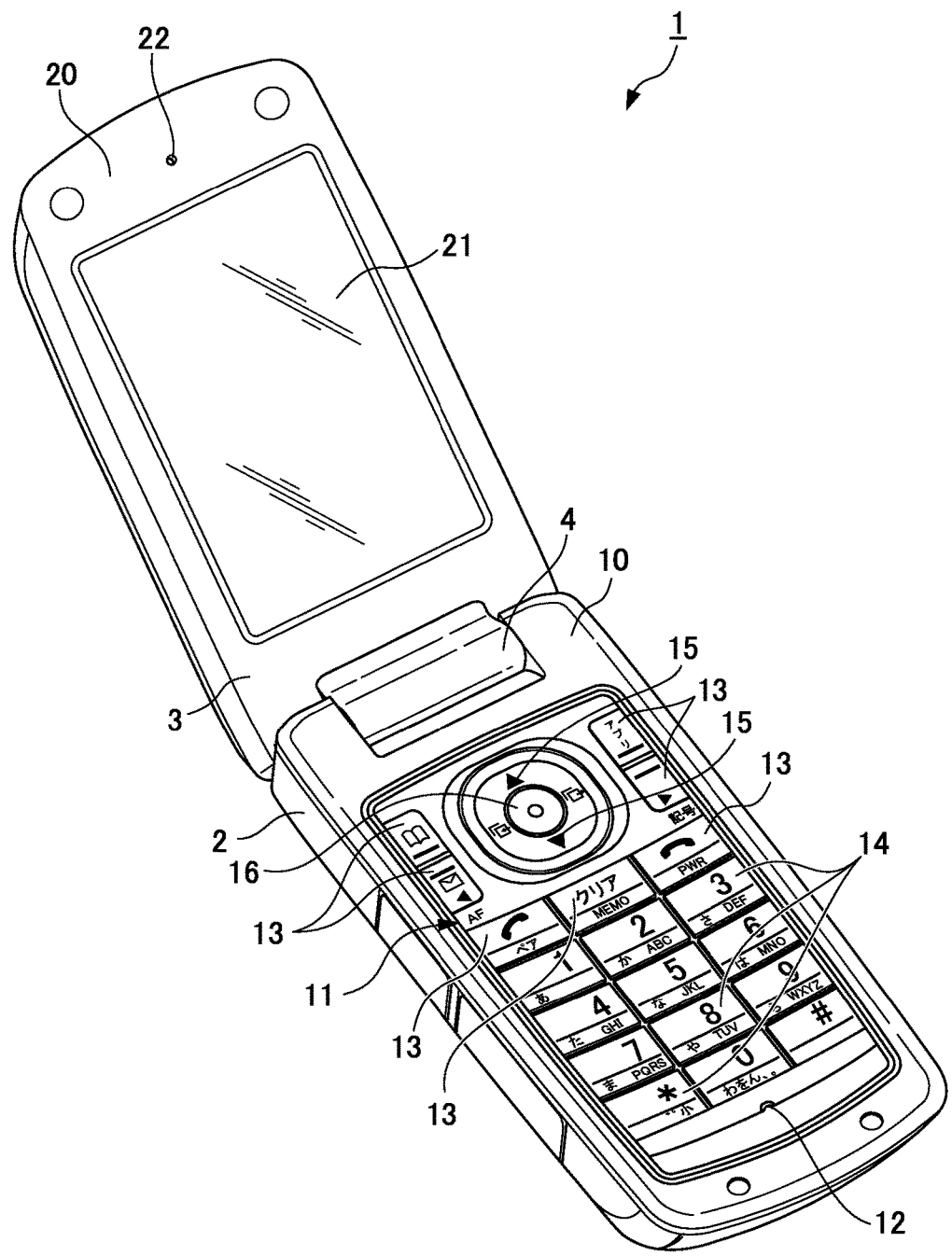
FIG. 1 is a perspective view showing an appearance of a mobile telephone device as an example of an electronic device according to the present invention.

Descriptions are provided hereinafter regarding an embodiment of the present invention with reference to FIGS. 1 to 9. Although the present embodiment shows a mobile telephone device 1 of a so-called folder-type as shown in FIG. 1, the mobile telephone device 1 according to the present invention is not particularly limited thereto. For example, the type of the mobile telephone device may be a slider type in which one of the bodies slides to one direction in a state in which the bodies are mutually superimposed; a rotating (turning) type in which one of the bodies is rotated around an axis line along the direction of superimposing the bodies; or a type (straight type or flip type) in which operation keys 11 (to be described later) and a display unit 21 (to be described later) are disposed in one body without having a connecting portion. FIG. 1 is a perspective view showing an appearance of a mobile telephone device as an example of an electronic device according to the present invention.

The mobile telephone device 1 includes an operation unit side body 2 and a display unit side body 3. The operation unit side body 2 includes, on a front face portion 10 thereof, the operation keys 11 and a microphone 12 for inputting sound produced by a user of the mobile telephone device 1 during a phone call. The operation keys 11 are configured with: function setting keys 13 for various settings and for operating various functions such as a telephone number directory function and a mail function; input operation keys 14 (an operation unit) for inputting the digits of a telephone number and characters for mail, etc.; a selection operation key 15 (a selection unit, an information selection unit) for performing scrolling (selection); and a determination operation key 16 (a determination unit) for performing determination in various operations.

The display unit side body 3 includes, on a front face portion 20, the display unit 21 for displaying a variety of information, and a speaker 22 for outputting sound of the other party during a telephone call.

An upper end portion of the operation unit side body 2 and a lower end portion of the display unit side body 3 are connected via a hinge mechanism 4. The mobile telephone device 1 can be in a state where the operation unit side body 2 and the display unit side body 3 are apart from each other (opened state), and in a state where the operation unit side body 2 and the display unit side body 3 are contacting each other (folded state), as the operation unit side body 2 and the display unit side body 3, connected via the hinge mechanism 4, pivot with respect to each other.

Figure 2:
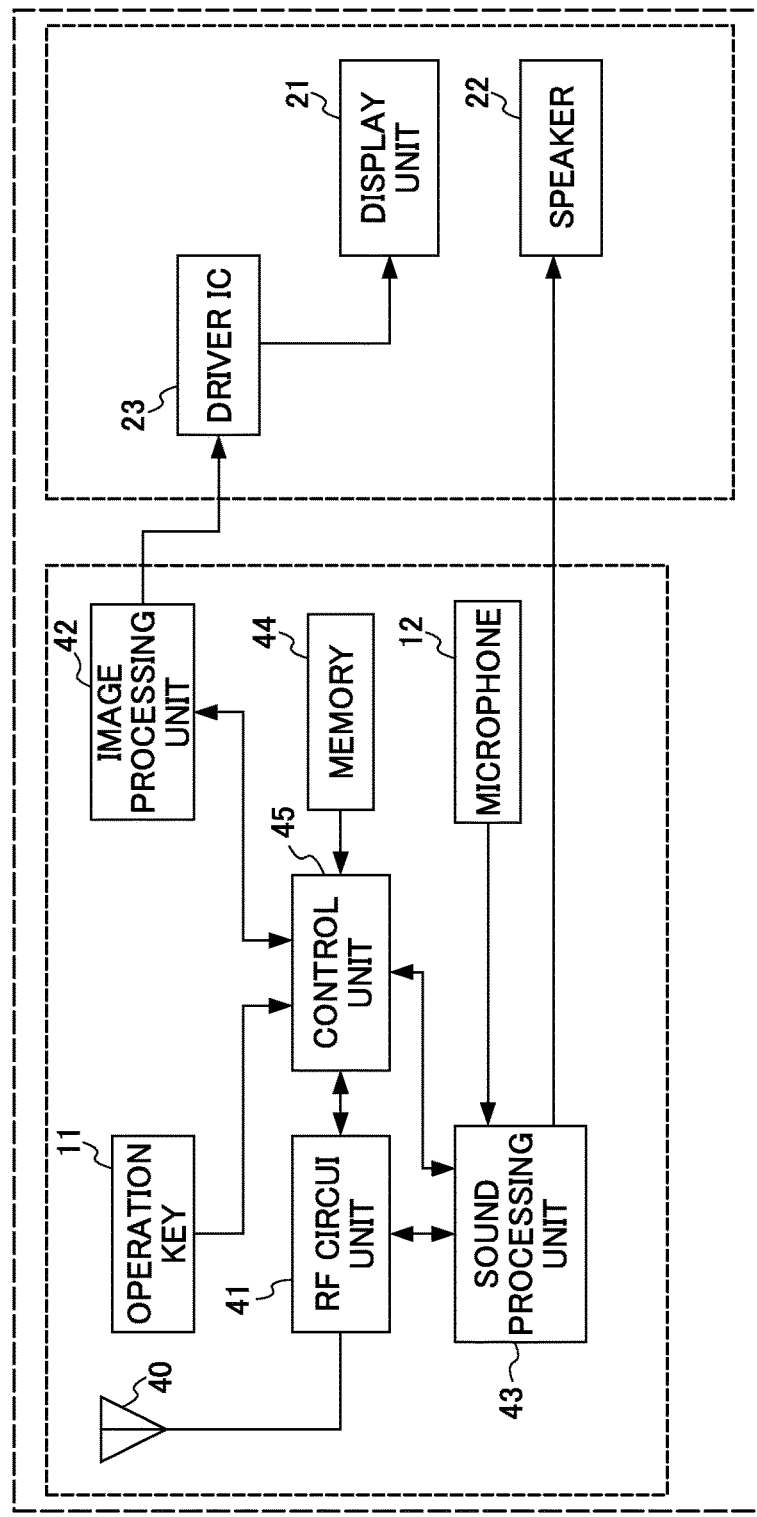
FIG. 2 is a functional block diagram showing functions of the mobile telephone device.

FIG. 2 is a functional block diagram showing functions of the mobile telephone device 1. As shown in FIG. 2, the mobile telephone device 1 includes: the operation keys 11, the microphone 12, a main antenna 40, an RF circuit unit 41, an image processing unit 42, a sound processing unit 43, memory 44 (a storage unit), a control unit 45, the display unit 21, the speaker 22, and a driver IC 23.

The memory 44 has a buffer area, a conversion database (hereinafter referred to as a conversion DB), and an address book DB (hereinafter referred to as an address book DB). The conversion DB stores dictionary information and information on usage history regarding the past conversion. The conversion DB is configured such that, when all or part of a predetermined input character string is input as search keywords, the conversion DB can extract associated information as a conversion candidate character string.

The address book DB stores an address book, in which a plurality of pieces of data are registered with the address book, in which address information associated with a name is a single record. The address book DB is configured such that, when all or part of a predetermined input character string is input, or search keywords predicted from a part of the predetermined input character string are input, the address book DB can extract associated data. A unique registration number is assigned to a record registered with the address book, and it is possible to search for a record associated with a registration number as a search keyword.

When a predetermined input character string is extracted from the conversion DB and the address book DB, the mobile telephone device 1 performs a search to extract all or part of the character string, or a part of the character string coinciding with a search keyword, as conversion candidate character strings. For example, when an input character string "suzuki" in hiragana characters is input, the mobile telephone device 1 extracts "suzuki" in kanji characters, "suzuki" in katakana characters and the like as conversion candidate character strings. When performing a search to extract conversion candidate character strings by performing prediction based on a part of a search keyword, for example, in a case in which an input character string "su" in a hiragana character is input, the mobile telephone device 1 predicts character strings to be input after "su", and extracts "suzuki" in kanji characters, "suzuki" in katakana characters and the like as conversion candidate character strings. In a case in which a plurality of conversion candidate character strings can be extracted, the mobile telephone device 1 extracts such character strings as conversion candidate character strings by considering usage history, attributes (for example, DB used for extraction) and the like. In the present embodiment, the mobile telephone device 1 extracts character strings registered with the address book DB as conversion candidate character strings.

Here, names (name information) are data configured with, for example, a personal name composed of a full name, a company name, a facility name and the like, and all or part of, or characters predicted from a part of, a predetermined pronunciation of a name, spelling of a name, address information in an identical record can be searched for as search keywords. Regarding the names, a personal name is configured such that, for example, a family name or a first name thereof can be searched for.

The address information is data configured with, for example, a telephone number, an email address, a web address, a postal address and the like, in which spelling and a predetermined pronunciation associated with a name in an identical record can be searched for as search keywords.

An input character string is configured with a single or a plurality of non-numeric characters, numeric characters or symbols, and is input by operating the operation keys 11. A conversion candidate character string is configured with a single or a plurality of non-numeric characters, numeric characters or symbols associated with an input character string. A determined character string is configured with a single or a plurality of non-numeric characters, numeric characters or symbols determined from among conversion candidate character strings.

The memory 44 includes, for example, working memory, and is utilized for arithmetic processing by the control unit 45. The memory 44 stores a plurality of applications, as well as a variety of tables and the like required by the applications.

Figure 4:
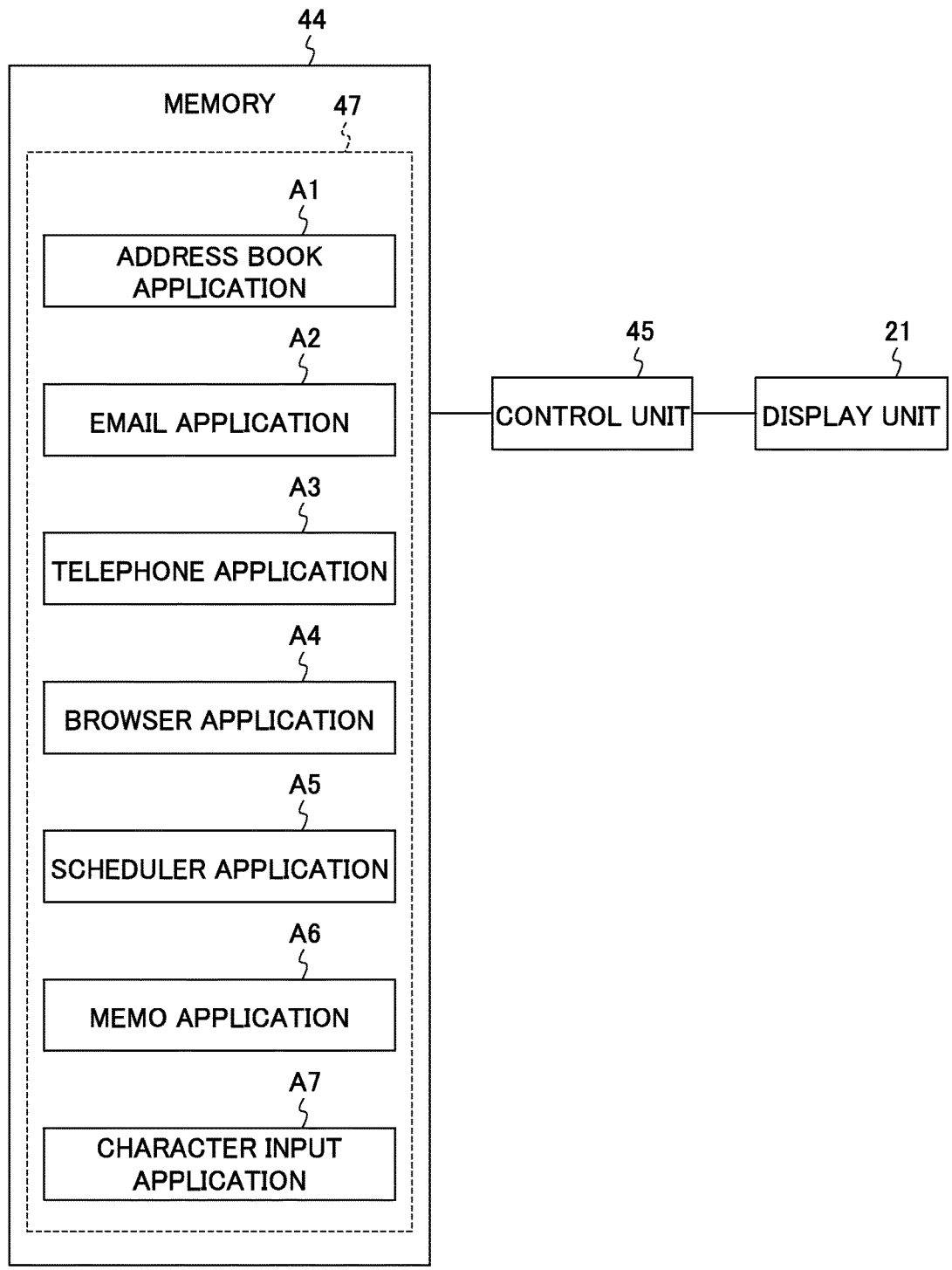
FIG. 4 is a functional block diagram showing a relationship between the applications and the functions, with which the mobile telephone device achieves functions according to an embodiment.

As shown in FIG. 4, the memory 44 stores a variety of applications (in the present embodiment, an address book application A1, an email application A2, a telephone application A3, a browser application A4, a scheduler application A5, a memo application A6, and a character input application A7). FIG. 4 is a functional block diagram showing a relationship between the applications and functions, with which the mobile telephone device 1 achieves functions according to an embodiment.

The address book application A1 is linked with the address book so as to be capable of utilizing the address book, and can extract a desired name or address information or the like associated with a record, by using a pronunciation and the like as search keywords for searching the address book. By designating address information thus extracted, the address book application A1 can execute processing (for example, processing for a telephone call, email, browsing and the like) associated with the address information.

The email application A2 is an application configured to be capable of executing processing regarding email, such as creating, browsing, transmitting or receiving email. The email application A2 is configured to be capable of being linked with the address book for inputting a destination address and the like of email.

The telephone application A3 is an application configured to be capable of executing processing regarding outgoing/incoming telephone calls. The telephone application A3 is configured to be capable of being linked with the address book for designating an outgoing call, displaying information regarding an incoming call, and the like. The telephone application A3 is a resident application that is running even in a standby state.

The browser application A4 is an application configured to be capable of browsing a web page and the like associated with a predetermined address. The browser application A4 is configured to be capable of being linked with the address book for designating an address and the like.

The scheduler application A5 is an application liked with a calendar to manage registered schedules. The scheduler application A5 can search the registered schedules for a desired schedule by using schedule information such as scheduled date/time and a schedule number as keywords. The scheduler application A5 can provide notification of a registered schedule on a predetermined date and time.

The memo application A6 is an application that can register text data, and manage each memo. The memo application A6 can search for a desired memo by using a number assigned to a memo and text registered with a memo as search keywords.

The character input application A7 is an application configured to display an input from the operation keys 11, and to develop the input on a variety of applications. When any one of the input operation keys 14 is operated in a wallpaper screen (an initial screen), the character input application A7 can display a non-numeric character, a numeric character or a symbol assigned to the input operation key 14, according to the setting. The character input application A7 is configured to be capable of concurrently displaying a plurality of non-numeric characters, numeric characters or symbols assigned to the input operation keys 14, according to the setting. The wallpaper screen (the initial screen) is a screen that is displayed while waiting for an incoming call, and while waiting for activation or operation of an application.

The operation keys 11 are configured with the function setting keys 13, the input operation keys 14, the selection operation key 15, and the determination operation key 16. The function setting keys 13 are keys configured to be capable of executing predetermined functions. The input operation keys 14 are keys for performing a variety of inputs such as non-numeric character inputs and numeric character inputs. The selection operation key 15 is a key for performing selection from among a plurality of candidates. The determination operation key 16 is a key for executing (determining) a selected function. A predetermined function is assigned to each of the operation keys 11 (the function setting keys 13, the input operation keys 14, the selection operation key 15, and the determination operation key 16), essentially in accordance with an application that is currently activated.

The main antenna 40 is configured to communicate with external devices such as base stations via a predetermined usable frequency band (for example, 800 MHz band). Although 800 MHz is set as the predetermined usable frequency band in the present embodiment, other frequency bands can also be used.

The RF circuit unit 41 executes demodulation processing on a signal received via the main antenna 40, and transmits the processed signal to the control unit 45. The RF circuit unit 41 executes modulation processing on the signal transmitted from the control unit 45, and transmits the signal to external devices via the main antenna 40. On the other hand, the RF circuit unit 41 notifies the control unit 45 of the intensity of a signal received via the main antenna 40.

The image processing unit 42 executes predetermined image processing, and outputs the processed image data to the driver IC 23, according to control by the control unit 45. When the image data is transmitted from the image processing unit 42, the driver IC 23 stores the image data in frame memory, and outputs the image data on the display unit 21 at predetermined timing.

The sound processing unit 43 executes predetermined sound processing on a signal transmitted from the RF circuit unit 41 in accordance with control by the control unit 45, and outputs the processed signal to the speaker 22. The speaker 22 externally outputs the signal that is transmitted from the sound processing unit 43.

When a signal is input from the microphone 12, the sound processing unit 43 processes the signal, and outputs the processed signal to the RF circuit unit 41, in accordance with control by the control unit 45. The RF circuit unit 41 executes predetermined processing on the signal transmitted from the sound processing unit 43, and outputs the processed signal to the main antenna 40.

The control unit 45 controls the entirety of the mobile telephone device 1, and is configured by employing a central processing unit (CPU) and the like.

The mobile telephone device 1 with such a configuration has a function capable of utilizing address information, in which conversion candidate character strings are based on an input character string.

Figure 3:
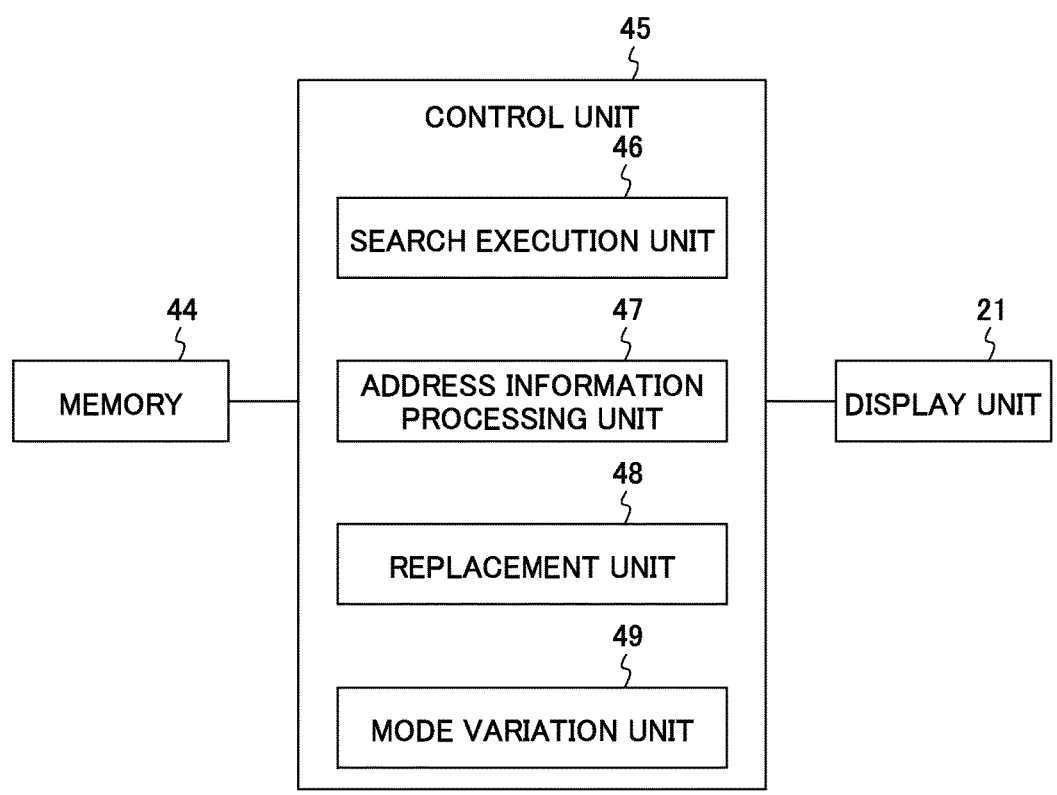
FIG. 3 is a functional block diagram showing a relationship of each function, with which the mobile telephone device 1 achieves functions according to an embodiment.
Figure 5:
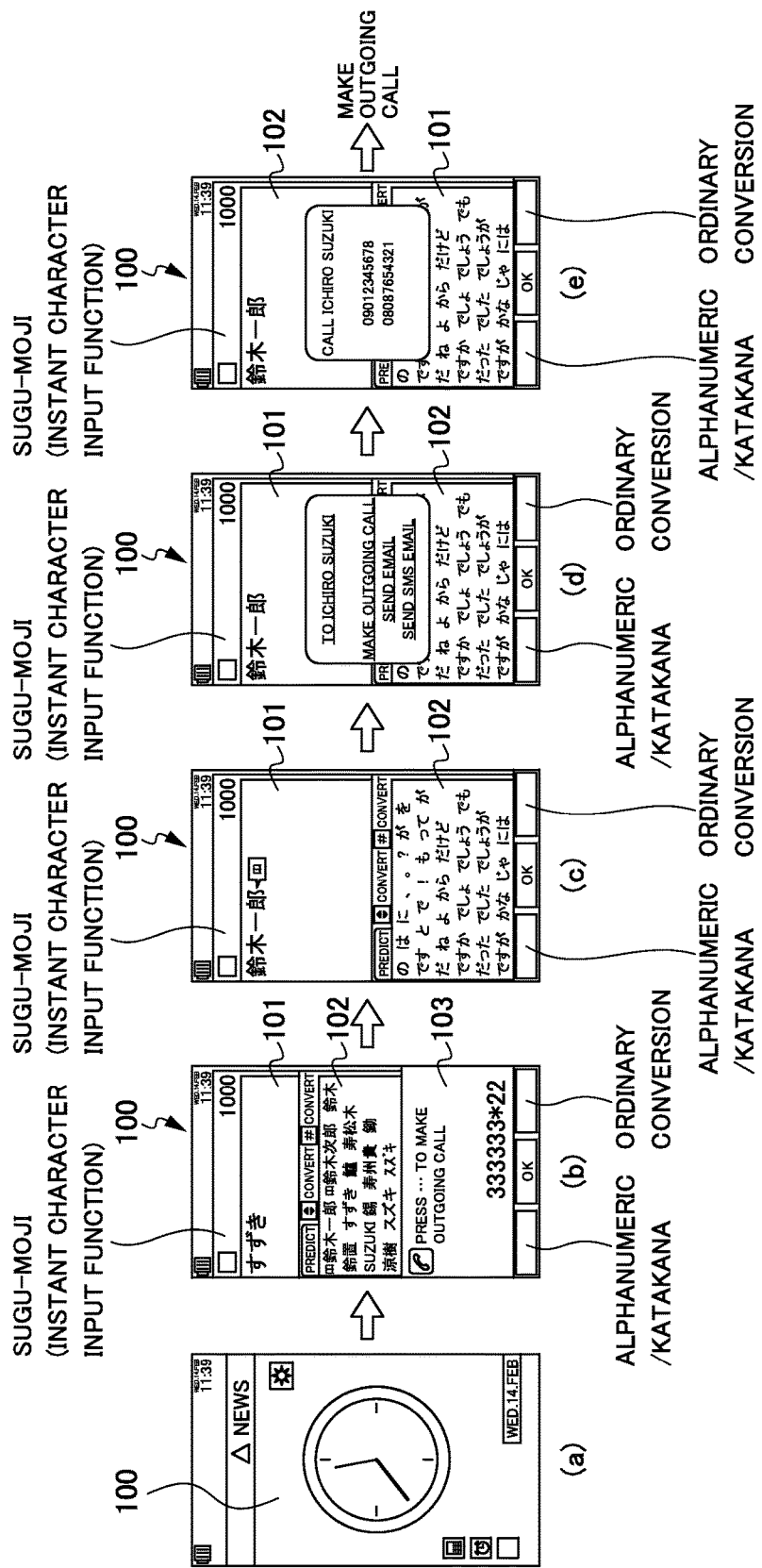
FIG. 5 is a first schematic diagram showing a screen to transition in a case of utilizing a character input function.
Figure 6:
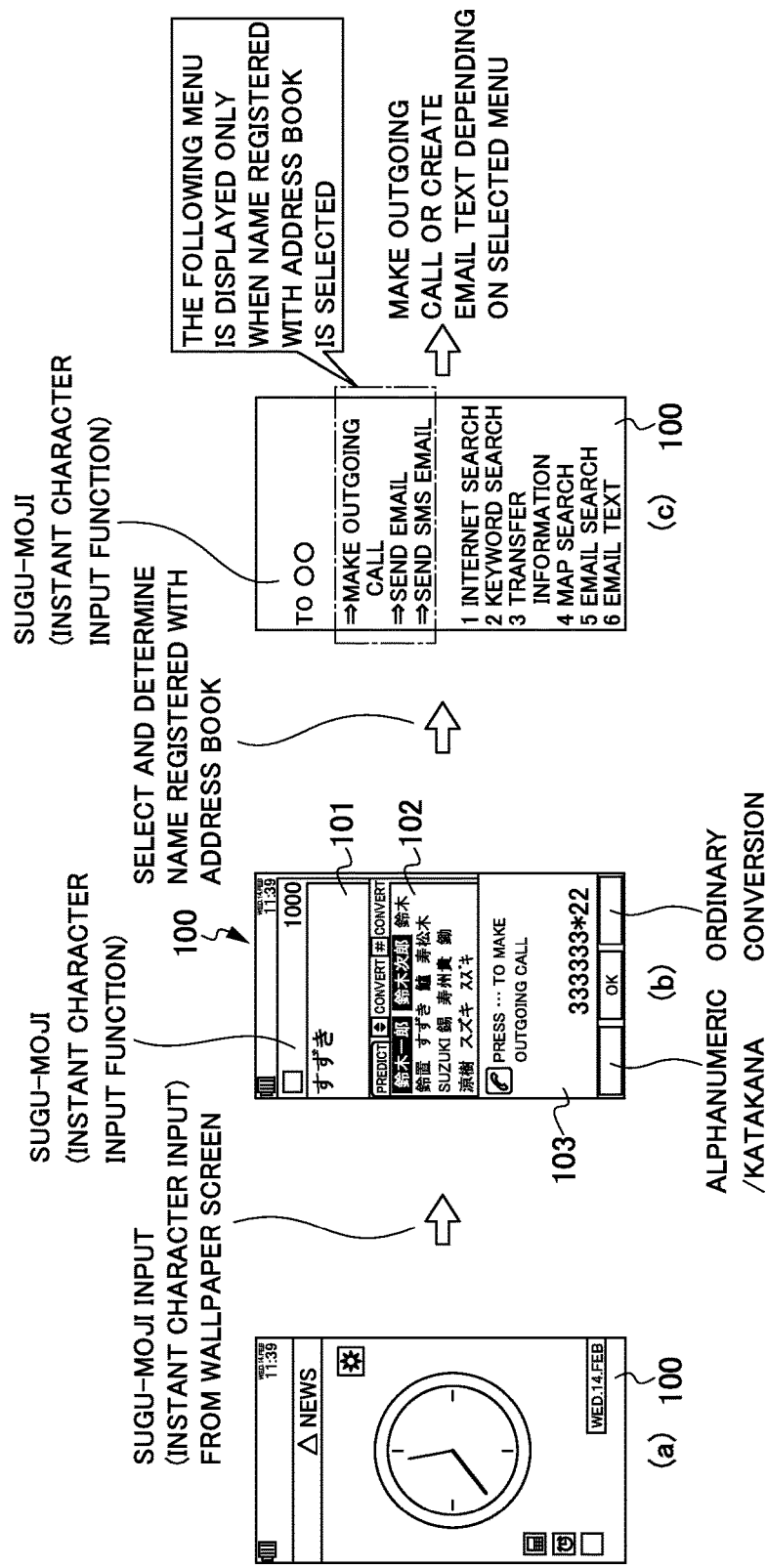
FIG. 6 is a second schematic diagram showing a screen to transition in a case of utilizing the character input function.
Figure 7:
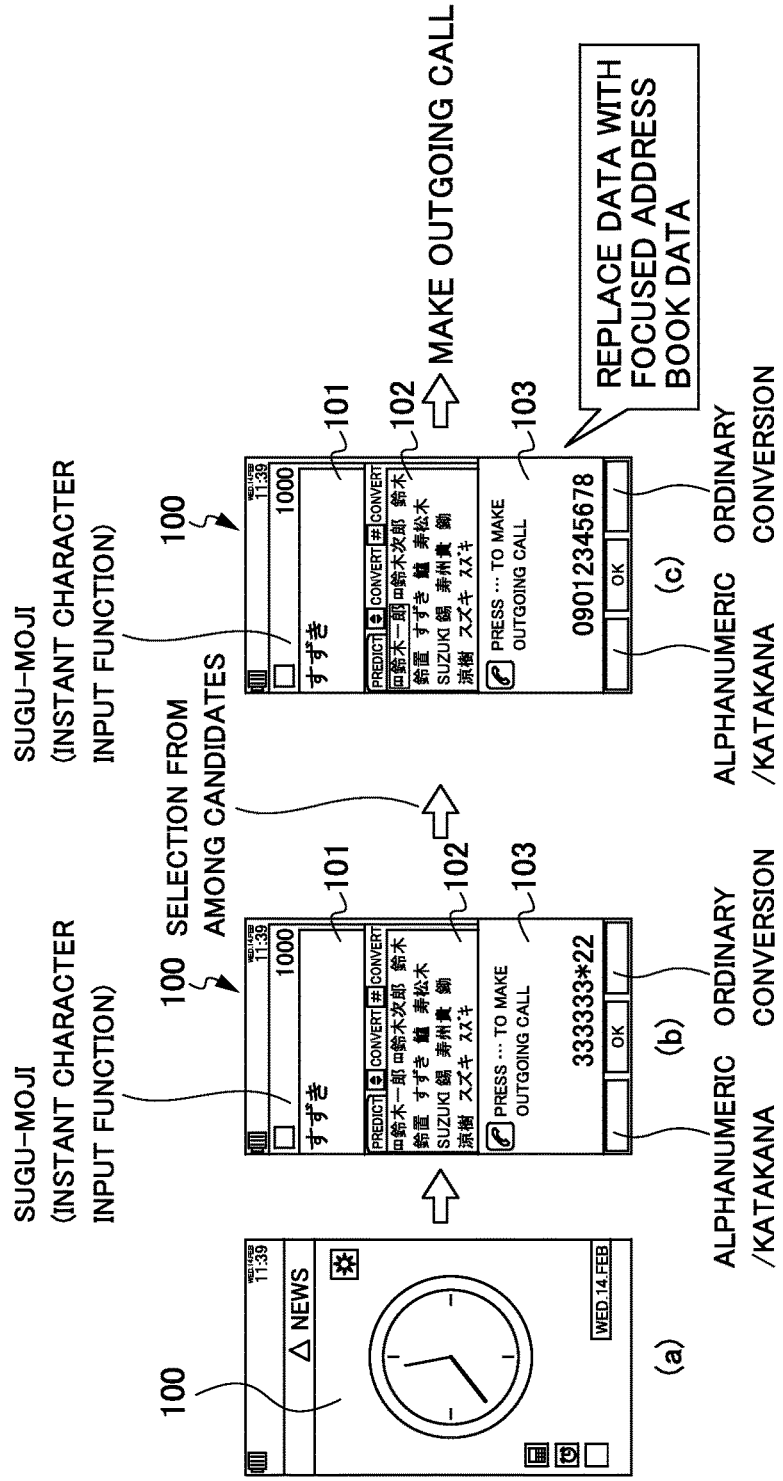
FIG. 7 is a third schematic diagram showing a screen to transition in a case of utilizing the character input function.

Descriptions are hereinafter provided for a configuration for achieving the aforementioned function according to the mobile telephone device 1 with reference to FIGS. 3 to 7. FIG. 3 is a functional block diagram showing a relationship of each function, with which the mobile telephone device 1 achieves functions according to an embodiment. FIG. 5 is a first schematic diagram showing a screen to transition in a case of utilizing a character input function. FIG. 6 is a second schematic diagram showing a screen to transition in a case of utilizing the character input function. FIG. 7 is a third schematic diagram showing a screen to transition in a case of utilizing the character input function.

The mobile telephone device 1 includes the memory 44 (the storage unit), the input operation keys 14 (the operation unit), the display unit 21, a search execution unit 46, and the control unit 45. The memory 44 (the storage unit) stores the address book including names and address information. The input operation keys 14 (the operation unit) are configured to be capable of inputting a character string. The display unit 21 displays an input character string that is input by operating the input operation keys 14 (the operation unit), and conversion candidate character strings that are conversion candidates for the input character string. The search execution unit 46 searches the address book, based on the input character string that is input by operating the input operation keys 14 (the operation unit). The control unit 45 controls the display unit 21 to display names or address information, which is associated with the input character string used by the search execution unit 46 for searching, as conversion candidate character strings.

In the mobile telephone device 1 with such a configuration, as a result of operating the input operation keys 14 (the operation unit) to input a character string, the search execution unit 46 searches the address book, based on the input character string thus input. In the mobile telephone device 1, the control unit 45 controls the display unit 21 to display names or address information, which is associated with the input character string used by the search execution unit 46 for searching, as conversion candidate character strings.

In a case in which the address book is searched for address information associated with the input character string, for example, as shown in FIG. 5b (to be describing later), the mobile telephone device 1 displays conversion candidate character strings in an area for displaying conversion candidates. As a result, by selecting a conversion candidate character string, the mobile telephone device 1 replaces the input character string with the conversion candidate character string.

Therefore, based on the input character string, the mobile telephone device 1 can utilize information (names or address information) in the address book as conversion candidate character strings.

Simply by inputting a character string, the mobile telephone device 1 displays information in the address book as conversion candidate character strings. Accordingly, the mobile telephone device 1 can easily utilize information registered with the address book, and can improve the convenience.

For example, even in a case in which the address book is desired to be referred to while creating email text, the mobile telephone device 1 does not require an operation such as suspending creation of email text and separately searching the address book. As a result, the creation of email text is not suspended, and the operational feeling for the user is not impaired.

Since the mobile telephone device 1 displays information in the address book as conversion candidates for the input character string, the user does not feel discomfort in utilizing information in the address book.

The mobile telephone device 1 includes the selection operation key 15 (the selection unit), the determination operation key 16 (the determination unit), and an address information processing unit 47. The selection operation key 15 (the selection unit) selects a conversion candidate character string. The determination operation key 16 (the determination unit) determines the conversion candidate character string selected by the selection operation key 15 (the selection unit). The address information processing unit 47 executes processing linked with address information. In a case in which the selection operation key 15 (the selection unit) selects a conversion candidate character string associated with the address information, and the determination operation key 16 (the determination unit) determines the conversion candidate character string thus selected, the control unit 45 controls the address information processing unit 47 to execute processing associated with the address information linked with the conversion candidate character string.

The processing associated with the address information is, for example, processing of activating a predetermined application associated with an attribute of the address information. In the processing associated with address information, for example, address information including "@" is treated as an email address, and email text is created by designating the email address (the address information) as a destination. Address information as a numeric character string with a predetermined number of digits is treated as a telephone number, and an outgoing call is made to the telephone number by designating the telephone number (the address information) as a destination. Address information including "www" is treated as a web address, and a web page is browsed and displayed by designating the web address (the address information).

In the mobile telephone device 1 with such a configuration, the selection operation key 15 (selection unit) is operated to select a conversion candidate character string linked with address information, and the determination operation key 16 (the determination unit) is operated to determine the conversion candidate character string thus selected. In this case, the control unit 45 controls the address information processing unit 47 to execute processing associated with the address information linked with the conversion candidate character string. In the mobile telephone device 1, for example, when a conversion candidate character string associated with an email address is determined, the email application A2 is activated to display a screen for creating email text with the email address as a destination.

Therefore, since the mobile telephone device 1 executes processing such as activating an application associated with address information by selecting and determining a conversion candidate character string, the convenience is improved.

Even while operating a predetermined application capable of inputting characters, the mobile telephone device 1 can execute other applications; therefore, the user can enjoy an operational feeling as if simultaneously operating a plurality of applications, in spite of using a single application.

Since the mobile telephone device 1 executes processing of other applications while operating an application for inputting characters, the mobile telephone device 1 does not require an operation such as suspending a running application to separately activate another application; therefore, the user can enjoy a smooth operational feeling.

The mobile telephone device 1 includes the selection operation key 15 (the information selection unit). The selection operation key 15 (the information selection unit) selects address information. The memory 44 (the storage unit) stores the address book including names and a plurality of pieces of address information. In a case in which the selection operation key 15 (the selection unit) selects a conversion candidate character string linked with address information, and the determination operation key 16 (the determination unit) determines the conversion candidate character string thus selected, the control unit 45 controls the display unit 21 to display a plurality of pieces of address information linked with the conversion candidate character string; and in a case in which the selection operation key 15 (the information selection unit) selects a single piece of address information, the control unit 45 controls the address information processing unit 47 to execute processing associated with the single piece of address information.

In a case in which a conversion candidate character string is selected and determined, the mobile telephone device 1 with such a configuration displays related address information on the display unit 21. In the mobile telephone device 1, in a case in which a single piece of address information is selected from among a plurality of pieces of address information displayed, the control unit 45 controls the address information processing unit 47 to execute processing associated with the single piece of address information. For example, as shown in FIG. 5e (to be described later), the mobile telephone device 1 displays a plurality of telephone numbers associated with a conversion candidate character string. The plurality of pieces of address information may be a telephone number and an email address.

Therefore, the mobile telephone device 1 can be utilized even in a case in which a conversion candidate character string is associated with a plurality of pieces of address information.

The mobile telephone device 1 includes the selection operation key 15 (the selection unit), the determination operation key 16 (the determination unit), and a replacement unit 48. The selection operation key 15 (the selection unit) selects a conversion candidate character string. The determination operation key 16 (the determination unit) determines the conversion candidate character string selected by the selection operation key 15 (the selection unit). The replacement unit 48 replaces an input character string with address information. In a case in which the selection operation key 15 (the selection unit) selects a conversion candidate character string linked with address information, and the determination operation key 16 (the determination unit) determines the conversion candidate character string thus selected, the control unit 45 controls the replacement unit 48 to replace the input character string with the address information so as to be displayed.

In the mobile telephone device 1 with such a configuration, the selection operation key 15 (the selection unit) selects a conversion candidate character string linked with the address information, and the determination operation key 16 (the determination unit) determines the conversion candidate character string thus selected. In this case, in the mobile telephone device 1, the control unit 45 controls the replacement unit 48 to replace the input character string with the address information so as to be displayed. For example, in a case in which the mobile telephone device 1 determines a conversion candidate character string association with address information, then a name displayed as a conversion candidate character string is not determined, but is replaced with address information (an email address or the like) associated with the conversion candidate character string, and the address information is displayed as a determined character string.

Therefore, since an input character string is replaced with address information by selecting and determining a conversion candidate character string linked with address information, the mobile telephone device 1 can utilize address information as character information. As a result, in the mobile telephone device 1, for example, in a case in which an email address is desired to be described in email text for the purpose of reporting the email address to the other party, it is not necessary to take note of address information when creating email text. The mobile telephone device 1 can utilize address information as character information, and can improve the convenience.

The mobile telephone device 1 includes a mode variation unit 49. The mode variation unit 49 varies a mode of displaying conversion candidate character strings on the display unit 21, between an ordinary display mode (a first mode) and another display mode (a second mode) different from the ordinary display mode (the first mode). In a case in which a conversion candidate character string linked with address information is displayed, the control unit 45 controls the mode variation unit 49 to display the conversion candidate character string in a mode (the second mode) different from the ordinary mode.

In the mobile telephone device 1 with such a configuration, in a case in which a conversion candidate character string linked with address information is displayed, the control unit 45 controls the mode variation unit 49 to perform display in a mode different from the ordinary display. For example, as shown in FIG. 5b (to be described later), the mobile telephone device 1 displays a name with an icon image schematically representing the address book.

Therefore, in a case in which a conversion candidate character string linked with address information is displayed, the mobile telephone device 1 displays the conversion candidate character string in a mode different from the ordinary display; accordingly, whether a character string is a conversion candidate character string linked with address information can be easily determined, and the convenience can be improved. The different mode may not use an icon image, but may use a different color or font.

The mobile telephone device 1 has a plurality of processes as processing associated with address information. Examples of the plurality of processes include making an outgoing call, creating email text, and displaying a browser. The control unit 45 controls the mode variation unit 49 to display conversion candidate character strings, which are linked with address information displayed correspondingly to the plurality of processes, in different modes.

In the mobile telephone device 1 with such a configuration, the control unit 45 controls the mode variation unit 49 to display conversion candidate character strings, which are linked with address information displayed correspondingly to the plurality of processes, in different modes. For example, as shown in FIG. 5b (to be described later), the mobile telephone device 1 displays a name with an image schematically representing a telephone receiver in a case in which the address information is a telephone number, or an image schematically representing email in a case in which the address information is an email address. The different mode may not use an icon image, but may use a different color or font.

Therefore, the mobile telephone device 1 displays conversion candidate character strings in different modes depending on the processing; accordingly, for example, by varying the display mode by using images or the like, it is possible to determine which processing can be executed for a conversion candidate character string being address information, and the convenience can be improved.

The memory 44 (the storage unit) stores the address book including names and registration numbers. The input operation keys 14 (the operation unit) include a plurality of keys assigned with non-numeric characters and numeric characters. In a case in which a key of the operation unit is operated in a state where the initial screen is displayed, the display unit 21 displays a non-numeric character and a numeric character assigned to the key thus operated. In response to the operation of the input operation keys 14 (the operation unit), the control unit 45 controls the display unit 21 to display a non-numeric character string and a numeric character string. As a result of searching by the search execution unit 46, in a case in which the numeric character string displayed on the display unit 21 coincides with a registration number, the control unit 45 controls the display unit 21 to display a name or address information associated with the registration number.

As a result of operating a key of the input operation keys 14 (the operation unit), the mobile telephone device 1 with such a configuration transitions from the state where the initial screen is displayed on the display unit 21, to a state where a non-numeric character string and a numeric character string, which correspond to the operation, are displayed on the display unit 21. As a result of searching by the search execution unit 46, in a case in which the numeric character string displayed on the display unit 21 coincides with a registration number, the control unit 45 controls the display unit 21 to display a name or address information associated with the registration number. For example, as shown in FIG. 7c (to be described later), in a case in which a numeric character "1" is input into the mobile telephone device 1, and a conversion candidate character string associated with address information with a registration number "1" is selected, a telephone number associated with the registration number "1" is displayed in a telephone number display area 103. When the determination operation key 16 or the like of the mobile telephone device 1 is operated, an outgoing call is made to the telephone number thus displayed.

The mobile telephone device 1 can display a name or address information, also based on a registration number associated with the name or address information. For example, in a case in which a registration number of a personal name "Suzuki" (in kanji characters) is "1", when the address book is ordinarily searched, a character string "suzuki" (in hiragana characters) associated with its pronunciation is required to be input (in which the user operates the input operation keys 14 eight times in total such as "333333*2"). However, only the numeric character "1" as the registration number is required to be input; therefore, the input operation can be simplified ("1" is displayed, and the user operates the key "1" of the input operation keys 14 once).

The memory 44 (the storage unit) stores the address book, in which names and a plurality of pieces of address information are associated with one another. The input operation keys 14 (the operation unit) have a plurality of keys assigned with non-numeric characters and numeric characters. In a case in which a key of the input operation keys 14 (the operation unit) is operated in a state where the initial screen is displayed, the display unit 21 displays a non-numeric character and a numeric character assigned to the key thus operated. In response to the operation of the input operation keys 14 (the operation unit), the control unit 45 controls the display unit 21 to display a non-numeric character string and a numeric character string. As a result of searching by the search execution unit 46, in a case in which the numeric character string displayed on the display unit 21 coincides with address information composed of a telephone number registered with the address book DB, the control unit 45 controls the display unit 21 to display a name associated with the address information, or another address information associated with the name.

In response to the operation of the input operation keys 14 (the operation unit), the mobile telephone device 1 with such a configuration enters a state where a non-numeric character string and a numeric character string are displayed on the display unit 21. As a result of searching by the search execution unit 46, in a case in which the numeric character string coincides with address information composed of a telephone number registered with the address book, the control unit 45 controls the display unit 21 to display a name associated with the address information, or another address information associated with the name. Such a coincidence may not be perfect matching, but may include partial matching as well. For example, when the input operation keys 14 of the mobile telephone device 1 are operated in the wallpaper screen, a telephone number associated with the input character string is displayed. When the determination operation key 16 or the like of the mobile telephone device 1 is operated, an outgoing call is made to the telephone number thus displayed.

Therefore, in a case in which there is a telephone number associated with a numeric character string that is input in the initial screen by the input operation keys 14, the mobile telephone device 1 displays an associated telephone number. As a result, since an operation such as, for example, activating the telephone application A3 or the like is not required in the mobile telephone device 1, an outgoing call can be easily made, and the convenience can be improved.

The mobile telephone device 1 includes the selection operation key 15 (the selection unit) and the replacement unit 48. The selection operation key 15 (the selection unit) selects a conversion candidate character string. The replacement unit 48 replaces address information with an input non-numeric character string or an input numeric character string. The input operation keys 14 (the operation unit) include a plurality of keys assigned with non-numeric characters and numeric characters. In a case in which a key of the input operation keys 14 is operated in a state where the initial screen is displayed, the display unit 21 displays a non-numeric character and a numeric character assigned to the key thus operated. In response to the operation of the input operation keys 14 (the operation unit), the control unit 45 controls the display unit 21 to display a non-numeric character string and a numeric character string. As a result of searching by the search execution unit 46, in a case in which the selection operation key 15 (the selection unit) selects a conversion candidate character string associated with a name displayed on the display unit 21, the control unit 45 controls the replacement unit 48 to replace the numeric character string displayed on the display unit 21 with address information composed of a telephone number associated with the name, and to display the address information.

In response to the operation of the input operation keys 14 (the operation unit), the mobile telephone device 1 with such a configuration enters a state where a non-numeric character string and a numeric character string are concurrently displayed on the display unit 21. As a result of searching by the search execution unit 46, in a case in which the selection operation key 15 (the selection unit) selects a conversion candidate character string associated with a name displayed on the display unit 21, the control unit 45 controls the replacement unit 48 to replace the numeric character string displayed on the display unit 21 with address information composed of a telephone number associated with the name, and to display the address information. For example, as shown in FIG. 7c (to be described later), by selecting a conversion candidate character string associated with a telephone number registered with the address book, the mobile telephone device 1 displays the telephone number associated with the conversion candidate character string in place of the numeric character string, in the telephone number display area 103. In a case in which another conversion candidate character string is selected, an input numeric character string is displayed.

In a case in which a conversion candidate character string associated with a name registered with the address book is selected, the mobile telephone device 1 replaces the numeric character string displayed on the display unit 21 with a telephone number so as to be displayed; therefore, a telephone number as a conversion candidate character string can be displayed for the user. As a result, the user can confirm the telephone number associated with the conversion candidate character string to make an outgoing call to the telephone number, and the convenience can be improved.

Figure 8:
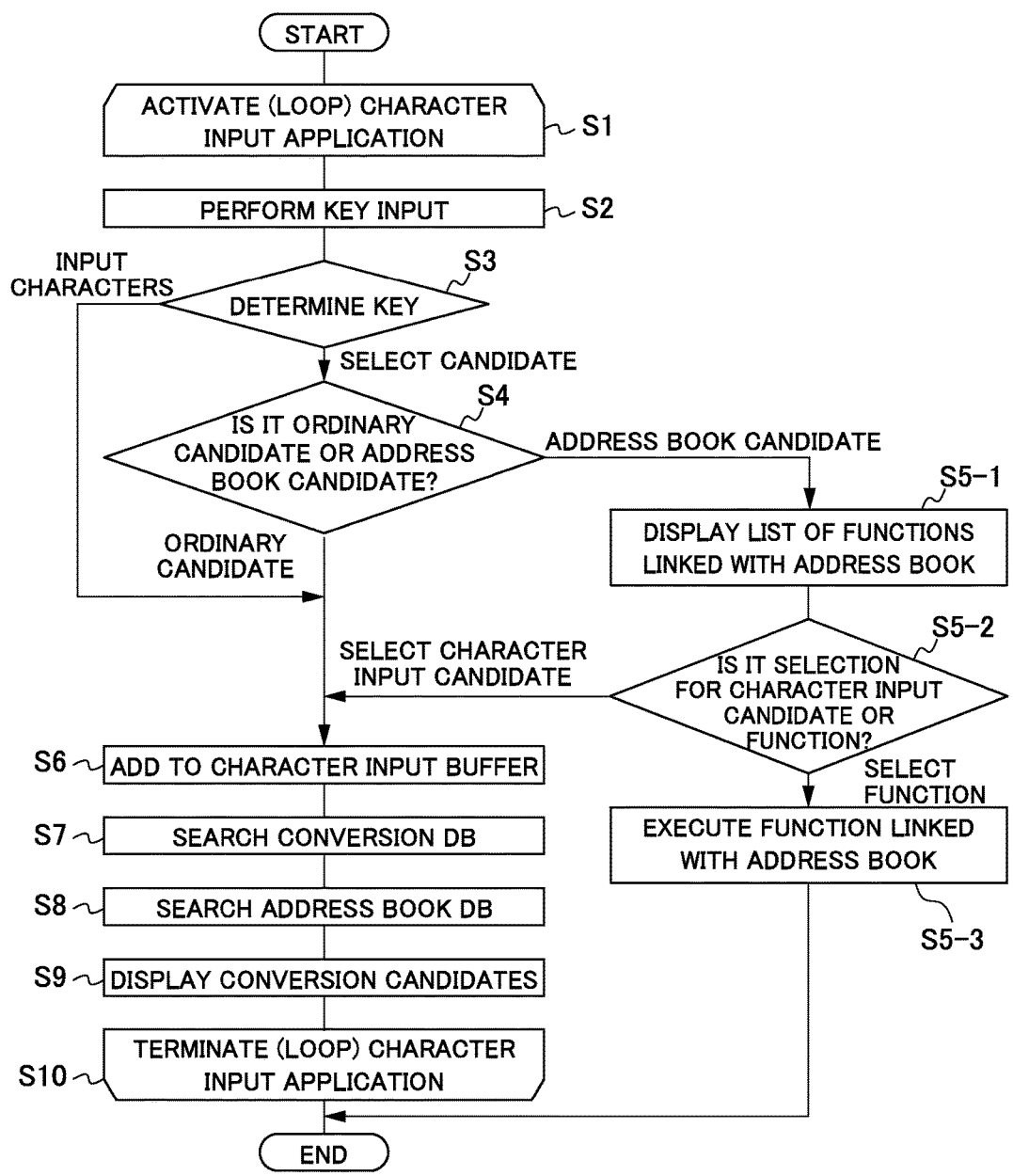
FIG. 8 is a flowchart showing operations (only character inputs) of the mobile telephone device according to an embodiment.

Next, descriptions are provided for operations of the mobile telephone device 1 according to the present embodiment with reference to each screen transition diagram shown in FIGS. 5 to 7 and a flowchart shown in FIG. 8. FIG. 8 is the flowchart showing operations (only character inputs) of the mobile telephone device according to an embodiment. In FIG. 5, keys are operated in the initial screen (see FIG. 5a), and based on such an operation, the screen transitions to a screen in which a non-numeric character string "suzuki" (in hiragana characters) and a numeric character string "333333*22" have been input (see FIG. 5b). Subsequently, when a personal name "Ichiro Suzuki" registered with the address book is selected in a conversion candidate display area 102, the screen transitions to a screen in which the personal name has been determined (see FIG. 5c). Subsequently, when a predetermined icon displayed in the character display area 101 is selected, the screen transitions to a screen displaying a pop-up menu from which a combination of "call" "Ichiro Suzuki" or the like can be selected (see FIG. 5d). Subsequently, when "call" is selected from the pop-up menu, the screen transitions to a screen as shown in FIG. 5e. FIG. 5e assumes a case in which two telephone numbers are registered. In FIG. 6, keys are operated in the initial screen (see FIG. 6a), and based on such an operation, the screen transitions to a screen in which a non-numeric character string "suzuki" (in hiragana characters) and a numeric character string "333333*22" have been input (see FIG. 6b). Subsequently, when the personal name "Ichiro Suzuki" registered with the address book is selected and determined in the conversion candidate display area 102, the screen transitions to a screen in which functional operations for the personal name "Ichiro Suzuki" can be selected (see FIG. 6c). Displaying conversion candidate character strings in a highlighted manner in the conversion candidate display area 102 in FIG. 6b indicates that such conversion candidate character strings are registered with the address book. In FIG. 7, keys are operated in the initial screen (see FIG. 7a), and based on such an operation, the screen transitions to a screen in which a non-numeric character string "suzuki" (in hiragana characters) and a numeric character string "333333*22" have been input (see FIG. 7b). Subsequently, when the personal name "Ichiro Suzuki" linked with the address book is selected in the conversion candidate display area 102, the screen transitions to a screen in which a telephone number associated with "Ichiro Suzuki" is displayed in the telephone number display area 103.

In Step S1, the control unit 45 activates (starts looping of) the character input application A7, and the processing advances to Step S2. More specifically, for example, the control unit 45 activates the character input application A7 when the mobile telephone device 1 is activated. As shown in FIG. 5a, by activating the character input application A7, and operating the input operation keys 14 in a standby state, the mobile telephone device 1 enters a state where a variety of processing is possible. The processing in Steps S1 to S10 is looped until the character input application A7 is terminated.

In Step S2, a key input is performed by the input operation keys 14, and the processing advances to Step S3. More specifically, a key input (an input of a character string) is performed by the input operation keys 14, and the control unit 45 accepts the key input from the input operation keys 14. As shown in FIG. 5b, by accepting the key input in Step S2, the control unit 45 controls the display unit 21 to display a non-numeric character string "suzuki" (in hiragana characters) corresponding to the key input in the character display area 101 of the screen 100, and to display a numeric character string including a symbol "333333*22" corresponding to the key input in the telephone number display area 103 of the screen 100.

In Step S3, the control unit 45 performs determination of the key input, and the processing advances to Step S4. More specifically, the control unit 45 determines whether the key input from the input operation keys 14 is an input of characters (a character input), or is an input for selecting a candidate (ordinary candidate (conversion candidate, predictive candidate), address book candidate). In a case in which the input is a character input, the processing advances to Step S6. In a case in which the input is determined to be an input for selecting a candidate (the candidate is selected), the processing advances to Step S4.

In Step S4, the control unit 45 determines whether the candidate thus selected is an ordinary candidate (conversion candidate or predictive candidate) or an address book candidate. In a case in which the candidate is determined to be an ordinary candidate (an ordinary predictive candidate), the processing advances to Step S6. In a case in which the candidate is determined to be an address book candidate, the processing advances to Step S5-1.

In Step S5-1, the control unit 45 controls the display unit 21 to display a list of functions linked with the address book, and the processing advances to Step S5-2. More specifically, the control unit 45 controls the display unit 21 to display a list of application functions that can be executed by using the address information associated with the conversion candidate character string thus selected.

As shown in FIG. 5c, in the mobile telephone device 1, in a case in which the conversion candidate character string "Ichiro Suzuki" associated with the address information is selected and determined from among conversion candidate character strings displayed in the conversion candidate display area 102 of the screen 100, a list of applications to be executed correspondingly to the address information is separately displayed, as shown in FIG. 5d. In a case in which there are not a plurality of pieces of processing associated with the address information, the control unit 45 may control the address information processing unit 47 to execute a single piece of processing associated with the address information without displaying the processing. Although a list of applications is displayed as a list of processing associated with address information in the present embodiment, it is not limited thereto. The list of applications may be displayed as, for example, a list of all the processing that can be executed by the mobile telephone device 1, in which processing not associated with address information is displayed but not selectable.

In Step S5-2, the control unit 45 determines whether the input is for selecting a character input candidate or for selecting a function. More specifically, as shown in FIG. 5d, the display unit 21 displays selectable functions. A predetermined function is selected from among the selectable functions (for example, telephone, email, and SMS email); alternatively, a character input candidate is selected by the determination operation key 16 or the like, without selecting a function. Based on such a selection, the control unit 45 determines whether the input is for selecting a character input candidate or for selecting a function. In a case in which the control unit 45 determines that a character input candidate will be selected (character input candidate selection), the processing advances to Step S6. In a case in which the control unit 45 determines that a function will be selected (function selection), the processing advances to Step S5-3.

In Step S5-3, the control unit 45 executes the function linked with the address book, and the processing is terminated. More specifically, based on the function selected in Step S5-2, the control unit 45 controls the address information processing unit 47 to execute (process) the function. In doing so, as shown in FIG. 5e, in a case in which there are a plurality of pieces of address information (telephone numbers) associated with the selected function (a displayed item "call" for making an outgoing call by executing the telephone application A3), the control unit 45 controls the display unit 21 to further display a list of the plurality of pieces of address information. In a case in which a single piece of address information (for example, "09012345678") is selected from among the plurality of pieces of address information, the control unit 45 controls the address information processing unit 47 to execute the processing (an outgoing call) for the selected address information ("09012345678").

In the present embodiment, in a case in which there are a plurality of pieces of address information associated with a selected application to be executed, the plurality of pieces of address information are separately displayed as shown in FIG. 5e, but it is not limited thereto. For example, by prioritizing the processing for address information that is considered to be frequently used (for example, address information in higher rank of registration), for example, the prioritized processing may be executed without performing selection.

In Step S6, the control unit 45 adds characters to a character input buffer, and the processing advances to Step S7. More specifically, since the input was determined to be a character input in Steps S3, S4 and S5-2, the control unit 45 adds characters associated with the input character string to the character input buffer of the memory 44. Since the processing in Step S3 is for determining an input character string as a determined character string, the determined character string is displayed in the character display area 101 of the screen 100, without executing the following processing.

In Step S7, the control unit 45 searches the conversion DB, and the processing advances to Step S8. More specifically, in a case in which an ordinary candidate is selected in Step S4, the control unit 45 controls the search execution unit 46 to search the conversion DB to extract conversion candidates or predictive candidates for the character string retained in the input character buffer.

In Step S8, the control unit 45 searches the address book DB, and the processing advances to Step S9. More specifically, in a case in which a character input candidate is selected in Step S5-2, the control unit 45 controls the search execution unit 46 to search the conversion DB to extract address book candidates for the character string retained in the input character buffer.

The search execution unit 46 searches the address book DB by using the input character string as a search keyword. In doing so, the search is performed for information registered as records in the address book (for example, names, email addresses, telephone numbers, postal addresses, and web addresses). Information coinciding with the registered information is retrieved, and a name in a record identical to the coinciding information will be displayed later as a conversion candidate character string.

In Step S9, the control unit 45 controls the display unit 21 to display conversion candidates, and the processing advances to Step S10. More specifically, as shown in FIG. 5b, the control unit 45 controls the display unit 21 to display the conversion candidates or the predictive candidates extracted in Step S7 in the conversion candidate display area 102 of the screen 100 ("Suzuki" and the like displayed in the conversion candidate display area 102 as shown in FIG. 5b). The control unit 45 controls the display unit 21 to display the address book candidates extracted in Step S8 in the conversion candidate display area 102 of the screen 100 ("Ichiro Suzuki" and "Jiro Suzuki" displayed in the conversion candidate display area 102 as shown in FIG. 5b).

As shown in FIG. 6b, the conversion candidate character strings associated with the address information can be displayed differently from the other conversion candidate character strings. In FIG. 6b, the conversion candidate character strings displayed in a highlighted manner in the conversion candidate display area 102 are associated with the address information.

In Step S10, the control unit 45 terminates the character input application A7, and the processing is terminated. More specifically, based on the displaying of the selected conversion candidate character string or the displaying of the text of the associated address information, the control unit 45 determines the selected conversion candidate character string as determined characters, and controls the display unit 21 to display the determined characters.

In doing so, by operating a specific key of the function setting keys 13 and the like when a conversion candidate character string is determined, the mobile telephone device 1 may display a selection screen for a variety of searches (internet, keyword, transfer information, map, email, and email text) as shown in FIG. 6c. In a case in which a conversion candidate character string associated with the address information is operated by a specific key of the function setting keys 13 and the like, as shown in a dashed dotted line in FIG. 6c, in addition to the variety of searches, processing associated with the address information may also be displayed in the selection screen.

In Step S10, in a case in which the control unit 45 does not terminate the character input application A7, the processing returns to Step S2.

In this way, the mobile telephone device 1 can utilize address information, based on an input character string.

Figure 9:
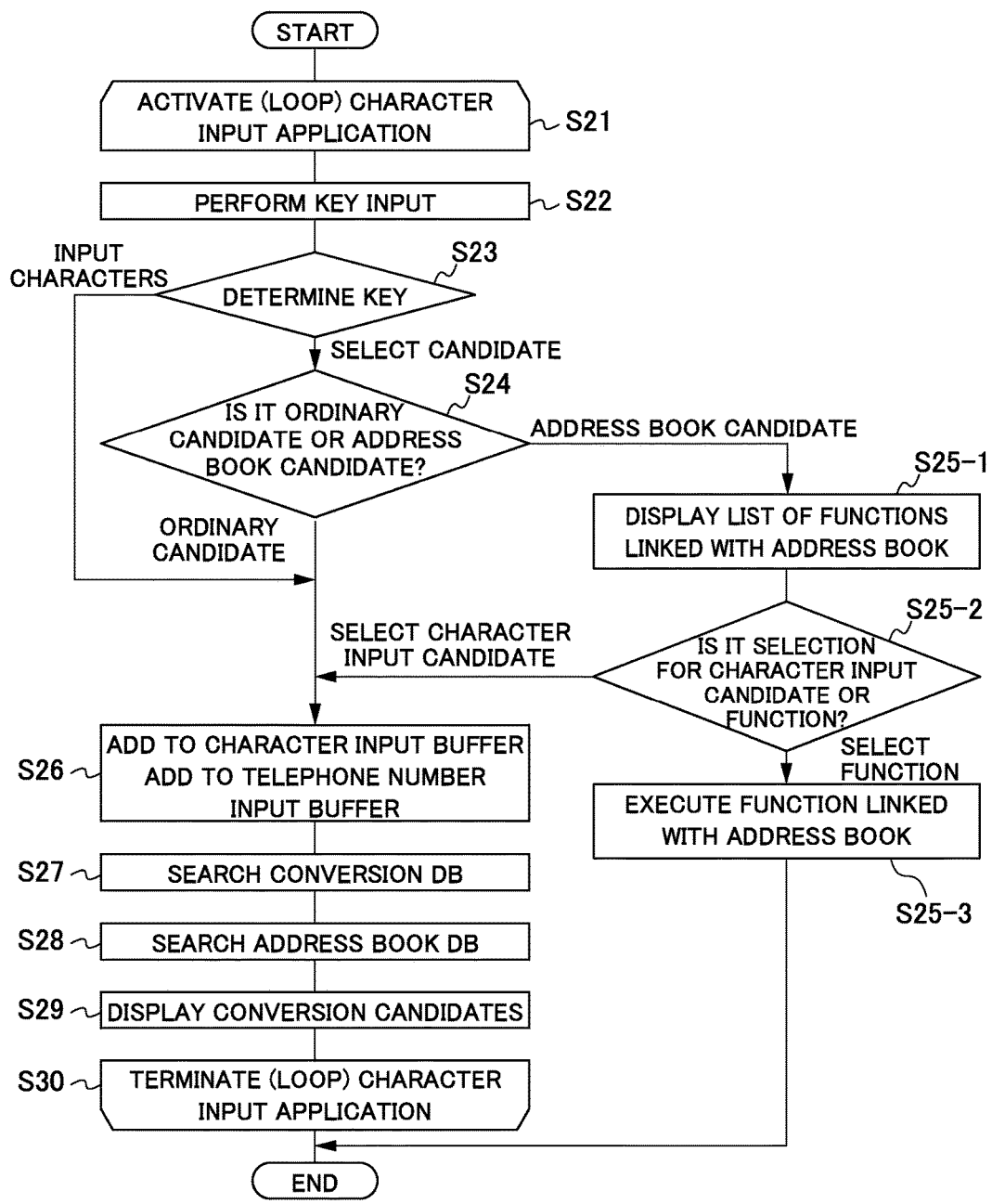
FIG. 9 is a flowchart showing operations (character inputs and telephone number inputs) of the mobile telephone device according to an embodiment.

Next, with reference to each screen transition diagram shown in FIGS. 5 to 7 and a flowchart shown in FIG. 9, descriptions are provided for operations of the mobile telephone device 1 in an embodiment in which the character input application A7 is running in the standby state, and search results corresponding to an input key are concurrently displayed on the screen (in the character display area and the telephone number display area). FIG. 9 is the flowchart showing operations (character inputs and telephone number inputs) of the mobile telephone device according to an embodiment.

In Step S21, the control unit 45 activates (starts looping of) the character input application A7, and the processing advances to Step S22. More specifically, for example, the control unit 45 activates the character input application A7 when the mobile telephone device 1 is activated. In the mobile telephone device 1 of the present embodiment, the character input application A7 is activated and resident when the mobile telephone device 1 is activated. The character input application A7 is configured to be activated when the mobile telephone device 1 is activated in the present embodiment, but the character input application A7 is not limited thereto, and may be configured to be activated, for example, when the operation keys 11 are operated to input characters or the like after the mobile telephone device 1 is activated.

As shown in FIG. 5a, by activating the character input application A7 when the mobile telephone device 1 is activated, and operating the input operation keys 14 in a standby state, the mobile telephone device 1 enters a state where a variety of processing is possible. The processing in Steps S21 to S30 is looped until the character input application A7 is terminated.

In Step S22, a key input is performed by the input operation keys 14, and the processing advances to Step S23. More specifically, a key input (an input of a character string) is performed by the input operation keys 14, and the control unit 45 accepts the key input from the input operation keys 14. As shown in FIG. 5b, by accepting the key input in Step S22, the control unit 45 controls the display unit 21 to display a non-numeric character string "suzuki" (in hiragana characters) corresponding to the key input in the character display area 101 of the screen 100, and to display a numeric character string including a symbol "333333*22" corresponding to the key input in the telephone number display area 103 of the screen 100.

In Step S23, the control unit 45 performs determination of the key input, and the processing advances to Step S24. More specifically, the control unit 45 determines whether the key input is an input of characters (a character input), or is an input for selecting a candidate (ordinary candidate (conversion candidate, predictive candidate), address book candidate). In a case in which the input is a character input, the processing advances to Step S26. In a case in which the input is determined to be an input for selecting a candidate (the candidate is selected), the processing advances to Step S24.

In Step S24, the control unit 45 determines whether the candidate thus selected is an ordinary candidate (conversion candidate or predictive candidate) or an address book candidate. In a case in which the candidate is determined to be an ordinary candidate (an ordinary predictive candidate), the processing advances to Step S26. In a case in which the candidate is determined to be an address book candidate, the processing advances to Step S25-1.

In Step S25-1, the control unit 45 controls the display unit 21 to display a list of functions linked with the address book, and the processing advances to Step S25-2. More specifically, the control unit 45 controls the display unit 21 to display a list of functions of applications that can be executed by using the address information associated with the conversion candidate character string thus selected.

As shown in FIG. 5b, in the mobile telephone device 1, in a case in which the conversion candidate character string "Ichiro Suzuki" associated with the address information is selected and determined from among the conversion candidate character strings displayed in the conversion candidate display area 102 of the screen 100, a list of applications to be executed correspondingly to the address information is separately displayed, as shown in FIG. 5d. In a case in which there are not a plurality of pieces of processing associated with the address information, the control unit 45 may control the address information processing unit 47 to execute a single piece of processing associated with the address information without displaying the processing. Although the list of applications is displayed as a list of processing associated with address information in the present embodiment, it is not limited thereto. The list of applications may be displayed as, for example, a list of all the processing that can be executed by the mobile telephone device 1, in which processing not associated with address information is displayed but not selectable.

In doing so, as shown in FIG. 7c, by selecting the conversion candidate character string ("Ichiro Suzuki") associated with the address information, the control unit 45 may control the replacement unit 48 to replace the input numeric character string "333333*22" displayed in the telephone number display area 103 of the screen 100 with the address information ("09012345678") associated with the conversion candidate character string. When the selection is switched to another conversion candidate character string (for example, "suzuki" in katakana characters), the control unit 45 may control the replacement unit 48 to reversely replace the address information with the input numeric character string "333333*22". While the address information ("09012345678") associated with the conversion candidate character string is being displayed as a result of replacement by the replacement unit 48, the function setting keys 13 or the like may be operated to activate the telephone application A3 to make an outgoing call to the telephone number ("09012345678").

In Step S25-2, the control unit 45 determines whether the input is for selecting a character input candidate or for selecting a function. More specifically, as shown in FIG. 5d, the display unit 21 displays selectable functions. A predetermined function is selected from among the selectable functions (for example, telephone, email, and SMS email); alternatively, a character input candidate is selected by the determination operation key 16 or the like, without selecting a function. Based on such a selection, the control unit 45 determines whether the input is for selecting a character input candidate or for selecting a function. In a case in which the control unit 45 determines that a character input candidate will be selected (character input candidate selection), the processing advances to Step S26. In a case in which the control unit 45 determines that a function will be selected (function selection), the processing advances to Step S25-3.

In Step S25-3, the control unit 45 executes the function linked with the address book, and the processing is terminated. More specifically, based on the function selected in Step S25-2, the control unit 45 controls the address information processing unit 47 to execute (process) the function. In doing so, as shown in FIG. 5e, in a case in which there are a plurality of pieces of address information (telephone numbers) associated with the selected function (the displayed item "call" for making an outgoing call by executing the telephone application A3), the control unit 45 controls the display unit 21 to further display a list of the plurality of pieces of address information. In a case in which a single piece of address information (for example, "09012345678") is selected from among the plurality of pieces of address information, the control unit 45 controls the address information processing unit 47 to execute the processing (an outgoing call) for the selected address information ("09012345678").

Since the character input application A7 is running in the standby state of the mobile telephone device 1 in the present embodiment, it is possible to execute processing associated with address information without activating a predetermined application in the standby state.

In the present embodiment, in a case in which there are a plurality of pieces of address information associated with a selected application to be executed, the plurality of pieces of address information are separately displayed as shown in FIG. 5e, but it is not limited thereto. For example, by prioritizing the processing for address information that is considered to be frequently used (for example, address information in higher rank of registration), for example, the prioritized processing may be executed without performing selection.

In Step S26, the control unit 45 adds characters to a non-numeric character input buffer and a numeric character input buffer, and the processing advances to Step S27. More specifically, since the input was determined to be a non-numeric character input in Steps S23, S24 and S25-2, the control unit 45 adds characters associated with the input character string to the non-numeric character input buffer of the memory 44. Numeric characters associated with the input character string are added to the numeric character input buffer of the memory 44. Since the processing in Step S23 is for determining characters of the input character strings as a determined character string, the determined character string is displayed in the character display area 101 of the screen 100, without executing the following processing.

In Step S27, the control unit 45 searches the conversion DB, and the processing advances to Step S28. More specifically, in a case in which an ordinary candidate is selected in Step S24, the control unit 45 controls the search execution unit 46 to search the conversion DB to extract conversion candidates or predictive candidates for the character string retained in the input character buffer.

In Step S28, the control unit 45 searches the address book DB, and the processing advances to Step S29. More specifically, in a case in which a character input candidate is selected in Step S25-2, the control unit 45 controls the search execution unit 46 to search the conversion DB to extract address book candidates for the character string retained in the input character buffer. Concurrently, address book candidates are extracted for the numeric character string retained in the input numeric character buffer. In doing so, regarding the numeric character string, the control unit 45 controls the search execution unit 46 to search for telephone numbers and registration numbers.

In Step S29, the control unit 45 controls the display unit 21 to display conversion candidates, and the processing advances to Step S30. More specifically, as shown in FIG. 5b, the control unit 45 controls the display unit 21 to display the conversion candidates or the predictive candidates extracted in Step S27 in the conversion candidate display area 102 of the screen 100 ("Suzuki" and the like displayed in the conversion candidate display area 102 as shown in FIG. 5b). The control unit 45 controls the display unit 21 to display the address book candidates, which were retrieved based on the non-numeric character string and the numeric character string extracted in Step S28, in the conversion candidate display area 102 of the screen 100 ("Ichiro Suzuki" and "Jiro Suzuki" displayed in the conversion candidate display area 102 as shown in FIG. 5b).

In doing so, as shown in FIG. 7b, by selecting the conversion candidate character string ("Ichiro Suzuki") associated with the address information, the control unit 45 may control the replacement unit 48 to replace the input numeric character string "333333*22" displayed in the telephone number display area 103 of the screen 100 with the address information ("09012345678") associated with the conversion candidate character string. When the selection is switched to another conversion candidate character string (for example, "suzuki" in katakana characters), the control unit 45 may control the replacement unit 48 to reversely replace the address information with the input numeric character string "333333*22".

As shown in FIG. 6b, the conversion candidate character strings associated with the address information can be displayed differently from the other conversion candidate character strings. In FIG. 6b, the conversion candidate character strings displayed in a highlighted manner in the conversion candidate display area 102 are associated with the address information.

In Step S30, the control unit 45 terminates the character input application A7, and the processing is terminated. More specifically, based on the displaying of the selected conversion candidate character string or the displaying of the text of the associated address information, the control unit 45 determines the selected conversion candidate character string as determined characters, and controls the display unit 21 to display the determined characters.

In doing so, by operating a specific key of the function setting keys 13 and the like when a conversion candidate character string is determined, the mobile telephone device 1 may display a selection screen for a variety of searches (internet, keyword, transfer information, map, email, and email text) as shown in FIG. 6c. In a case in which a conversion candidate character string associated with the address information is operated by a specific key of the function setting keys 13 and the like, as shown in the dashed dotted line in FIG. 6c, in addition to the variety of searches, processing associated with the address information may be displayed in the selection screen.

In Step S30, in a case in which the control unit 45 does not terminate the character input application A7, the processing returns to Step S22.

Consequently, the mobile telephone device 1 can utilize address information, based on an input character string.

Although the preferable embodiment of the mobile telephone device 1 according to the present invention has been described above, the mobile telephone device 1 according to the present invention is not limited to the aforementioned embodiment, and can be implemented in various embodiments.

Although the present embodiment has described the example, in which address information is utilized as a conversion candidate character string while running the character input application A7, it is not limited thereto. For example, address information can be utilized for inputting characters in a variety of applications such as the email application A2, the browser application A4, the scheduler application A5, and the memo application A6. With such a configuration, address information in the address book can be easily transferred or migrated to other applications. In the mobile telephone device 1 in which an application is activated as a single task, it is possible to perform display as if a plurality of applications are concurrently activated for enabling multitask implementation.

As an example of inputting in the present embodiment, the descriptions have provided in which the input operation keys 14 are operated to input corresponding katakana/hiragana characters and numeric characters; however, it is not limited thereto, and inputs associated with the input operation keys 14 are performed by setting. As another example of the present embodiment, for example, in a case in which a key of the input operation keys 14, the key assigned with a numeric character "2", a hiragana character "ka" and alphabetic characters "ABC", is operated in the wallpaper screen shown in FIG. 10 (a), any one of the alphabetic characters "A", "B" or "C" and the numeric character "2" are input, depending on the number of times the key of the input operation keys 14 is operated. In doing so, in a case in which the alphabetic character "A" is input, as shown in FIG. 10b, words with the initial "A" and stored in the conversion DB (for example, "ALBUM", "APPLE", etc.), and personal names and other names with the initial "A" and registered with the address book are displayed as conversion candidate character strings. In doing so, for example, in a case in which "ANDY" and "ALICIA" are registered with the address book, "ANDY" and "ALICIA" are displayed with indication that the names are registered with the address book. As shown in FIG. 10c, in a case in which "ANDY" is designated, subsequent processing is executed, such as displaying information registered with the address book (in this case, a telephone number of "ANDY" registered with the address book). FIG. 10 is a fourth schematic diagram showing a screen to transition in a case of utilizing the character input function.

Although the present invention has been described above for the mobile telephone device 1 as an example of the electronic device, it is not limited thereto, and the present invention can also be applied to a PHS (Personal Handyphone System). Moreover, the present invention can also be applied to electronic devices such as a portable gaming machine, a portable navigation device, a PDA (Personal Data Assistance), and a notebook computer.

EXPLANATION OF REFERENCE NUMERALS 1 mobile telephone device (electronic device)
14 input operation key (operation unit)
15 selection operation key (selection unit, information selection unit)
16 determination operation key (determination unit)
21 display unit
44 memory (storage unit)
46 search execution unit
45 control unit
47 address information processing unit
48 replacement unit
49 mode variation unit

The invention claimed is:

1. An electronic device, comprising:
a storage unit that stores address data including at least names or associated address information;
an operation unit that inputs a character string;
a display unit that displays the character string that is input by operating the operation unit, and conversion candidate character strings that are conversion candidates for the character string thus input, the conversion candidate character strings including associable conversion candidate character strings that link with the names and address information and non-associable conversion candidate character strings that do not link with the names and address information;
a search execution unit that searches the address data, based on the character string that is input by operating the operation unit; and
a control unit that controls the display unit to display the at least names or address information, which is associated with the input character string used by the search execution unit for searching, as an associable conversion candidate character string that links with the at least displayed names or address information.

2. The electronic device according to claim 1,
wherein the electronic device performs a plurality of processes as processing associated with the at least names or address information,
wherein the control unit controls the mode variation unit to display the associable conversion candidate character strings in different modes that correspond to the plurality of processes.

3. The electronic device according to claim 1,
wherein the address data includes registration numbers associated with the names,
wherein the operation unit includes a plurality of keys assigned with non-numeric characters and numeric characters,
wherein, in a case in which a key of the operation unit is operated in a state where an initial screen is displayed, the display unit displays a non-numeric character and a numeric character assigned to the key thus operated, and
wherein, in a state where a non-numeric character string and a numeric character string are displayed on the display unit in response to operation of at least one key of the operation unit, in a case in which the numeric character string displayed on the display unit coincides with one of the registration numbers as a result of searching by the search execution unit, the control unit controls the display unit to display a name associated with the registration number and address information associated with the name.

4. The electronic device according to claim 1,
wherein the address data includes a plurality of pieces of address information associated with the respective names,
wherein the operation unit includes a plurality of keys assigned with non-numeric characters and numeric characters,
wherein, in a case in which a key of the operation unit is operated in a state where an initial screen is displayed, the display unit displays a non-numeric character and a numeric character assigned to the key thus operated, and
wherein, in a state where a non-numeric character string and a numeric character string are displayed on the display unit in response to operation of at least one key of the operation unit, in a case in which the numeric character string displayed on the display unit coincides with a telephone number included in the address information of the address data as a result of searching by the search execution unit, the control unit controls the display unit to display a name associated with the address information, or another address information of the plurality of address information associated with the name.

5. The electronic device according to claim 1, further comprising:
a selection unit that selects a conversion candidate character string; and
a replacement unit that replaces address information with an input non-numeric character string or an input numeric character string,
wherein the operation unit includes a plurality of keys assigned with non-numeric characters and numeric characters,
wherein, in a case in which a key of the operation unit is operated in a state where an initial screen is displayed, the display unit displays a non-numeric character and a numeric character assigned to the key thus operated, and
wherein, in a state where a non-numeric character string and a numeric character string are displayed on the display unit in response to operation of at least one key of the operation unit, in a case in which the selection unit selects a conversion candidate character string associated with one of the names displayed on the display unit as a result of searching by the search execution unit, the control unit controls the replacement unit to replace the numeric character string displayed on the display unit with address information, including a telephone number associated with the name, and to display the address information.

6. The electronic device according to claim 1, further comprising a mode variation unit that varies a mode of displaying conversion candidate character strings on the display unit between a first mode when displaying a non-associable conversion character string, and a second mode, different from the first mode, when displaying an associable conversion character string.

7. The electronic device according to claim 1, wherein the control unit is configured to cause the display unit to display the conversion candidate character strings while displaying a plurality of applications corresponding to a plurality of processes associated with the at least names and address information.

* * * * *